United States Patent [19]
Doe et al.

[11] 3,856,197
[45] Dec. 24, 1974

[54] GUIDE ROLLERS
[75] Inventors: Ewart H. Doe, Houghton, Near Stockbridge; William J. Linforth, Chandlers Ford, Near Eastleigh, both of England
[73] Assignee: Twyford Moors (Aircraft & Engineering) Limited, Eastleigh, England
[22] Filed: Dec. 11, 1973
[21] Appl. No.: 423,866

[30] Foreign Application Priority Data
Dec. 28, 1972 Great Britain..................... 59896/72

[52] U.S. Cl.................... 226/181, 214/1.1, 226/189
[51] Int. Cl.......................................... B65h 17/22
[58] Field of Search ............ 214/1.1; 226/181, 188, 226/189, 190, 191, 192, 194, 108, 176

[56] References Cited
UNITED STATES PATENTS
3,627,187  12/1971  Hartkopf........................ 226/181 X Primary Examiner—M. Henson Wood, Jr.
Assistant Examiner—Gene A. Church
Attorney, Agent, or Firm—Markva & Smith

[57] ABSTRACT
An idler roller to cooperate with drive means of a bar feeder to feed bar stock material longitudinally through a guideway from a stock reel to a machine tool, wherein the idler roller is so mounted and cooperates with control means such that during operation of the drive means to feed bar longitudinally through the guideway, the idler roller is orientated with its axis of rotation perpendicular to the longitudinal axis of the guideway and during machining of the bar, when the bar is rotating about its own axis in the guideway, the idler roller is orientated with its axis of rotation parallel to the longitudinal axis of the guideway. Preferably a plurality of idler rollers are provided to cooperate with the drive means and each idler roller is mounted to swivel about a pivot axis perpendicular to the axis of rotation of the guide roller and perpendicular to the longitudinal axis of the guideway, swivelling of the idler rollers being caused by movement longitudinally of the guideway of a member mounting a toothed rack engaged with a pinion of each idler roller. Where the guideway is one of a plurality of guideways of a bar feeder for a multi-spindle machine tool, longitudinal movement of the rack and consequent swivelling of the idler rollers can be effected by indexing movement of the bar feeder to cause the guideway to move into a position at which feed of bar is effected. Alternatively, longitudinal movement of the rack can be effected by other means such as a pneumatic piston-cylinder arrangement.

8 Claims, 11 Drawing Figures

GUIDE ROLLERS

The invention relates to guide rollers for a bar feeder for feeding bar stock to a machine tool.

The term "bar" is used hereinafter to refer to elongated stock material in general and is to be understood to include material which is not solid or of circular section, for example material of tubular section or of hexagonal section.

Bar feeders are disclosed in copending U.S. application Ser. No. 344,651, filed Mar. 26, 1973 by Ewart Harold Doe for feeding bar stock material to a machine tool, comprising a guideway formed by a plurality of longitudinally extending members respectively displaceable outwardly from a centre line of the guideway to adjust the diameter of the guideway and including drive means movable to engage a bar lying in the guideway to move the bar longitudinally therein.

Such a bar feeder may be provided between a stock reel and a machine tool for which the stock reel holds bar material, to feed lengths of bar stock material through the collets of the machine tool against a dead stop of the machine tool so that fresh lengths of bar stock material are arranged in the collets to form new workpieces when the collets are closed.

The invention of this application is applicable to bar feeders of the kind disclosed in the above mentioned copending U.S. application Ser. No. 344,651, but is also applicable to other bar feeders, for example those which do not have guideways formed by longitudinally extending members which are displaceable outwardly to adjust the diameter of the guideway.

Bar feeders have been proposed wherein a rotated drive roller, having its axis of rotation perpendicular to the length of the bar stock material to be fed, is moved generally radially of the bar to engage the bar and to feed the bar longitudinally, idler rollers being provided on the opposite side of the bar to the drive roller. When the drive roller is engaged with the bar, it presses the bar against the idler rollers and the idler rollers prevent the bar binding in the guideway so that the drive roller can engage the bar with sufficient force to cause the rotation of the drive roller to move the bar longitudinally. When the collet of the machine tool is closed and the bar is snatched up to the rotational speed of the collet, marking of the surface of the bar by the idler rollers is extremely likely since, to perform satisfactorily in conjunction with the drive roller, the idler rollers must have their axis of rotation perpendicular to the longitudinal axis of the bar and thus when the bar is rotating with the collet of the machine tool, the bar surface is being dragged across the faces of the idler rollers. Where the bar feeder is designed to feed bar stock material of widely varying diameter, shaping of the face of the guide roller to prevent it marking the bar is ineffective or causes the idler rollers not to operate satisfactorily in conjunction with the drive roller when feeding a very small diameter bar.

According to the invention, there is provided in a bar feeder, to feed a length of bar stock material longitudinally through a guideway of the bar feeder to a machine tool, an idler roller to bear against said length of the bar and to cooperate with drive means of the bar feeder, said idler roller being so mounted and connected to control means that, during operation of the drive means to feed the bar longitudinally, the idler roller is orientated with its axis of rotation generally perpendicular to the longitudinal axis of the guideway, and, during machining of the bar by the machine tool, the idler roller is orientated with its axis of rotation generally parallel to the longitudinal axis of the guideway.

Preferably, a plurality of idler rollers are provided at each end of the guideway and, where the guideway is one of a plurality of guideways of a bar feeder for a multi-spindle machine tool, a plurality of idler rollers are provided at each end of each guideway.

Said plurality of idler rollers may comprise, at each end of the or each guideway, two sets of idler rollers with, for example, three idler rollers in each set, the rollers of one set being spaced circumferentially from the rollers of the other set around the guideway.

Each of the idler rollers is preferably mounted to swivel about a pivot axis generally perpendicular to the axis of rotation of the guide roller and generally perpendicular to the longitudinal axis of the guideway. The control means may comprise a pinion whereby the idler roller may be swivelled about said pivot axis by a rack having teeth meshed with the teeth of the pinion. The rack is preferably connected to a portion of the guideway which is longitudinally movable with respect to the remainder of the guideway to cause the rack to move by an amount sufficient to rotate the idler roller about said pivot axis through 90° when changing from a bar feed position to a machining position or vice versa.

A member of the guideway on which the or each idler roller at each end of the guideway is mounted, is preferably movable radially inwardly and outwardly of the guideway to adjust the diameter of the guideway to permit changes in diameter of the bar material to be fed and machined whereby the idler roller or rollers is or are automatically adjusted in position for a new diameter of bar to be machined when said member is adjusted in position.

Longitudinal movement of said portion of the guideway may be effected by indexing movement of the bar feeder to cause the guideway concerned to move into a position at which the bar is to be fed longitudinally therethrough, for example by causing a rollers and cam track to cooperate, one of the roller and the cam track being mounted on the portion of the bar feeder which indexes around and the other being stationary.

Alternatively, or in addition, and particularly when a machining operation is to be effected in the indexed position at which the bar is to be fed prior to actual feeding of the bar, longitudinal movement of said portion may be effected by other means, for example an air cylinder controlled by programming means of the machine tool.

In either case, swivelling of the idler roller or rollers into the bar feed position is effected simultaneously with opening of the respective collet of the machine tool and swivelling of the idler roller or rollers back into the machining position is effected simultaneously with closing of the respective collet.

The invention is diagrammatically illustrated by way of example in the accompanying drawings, in which.

Figure 1:
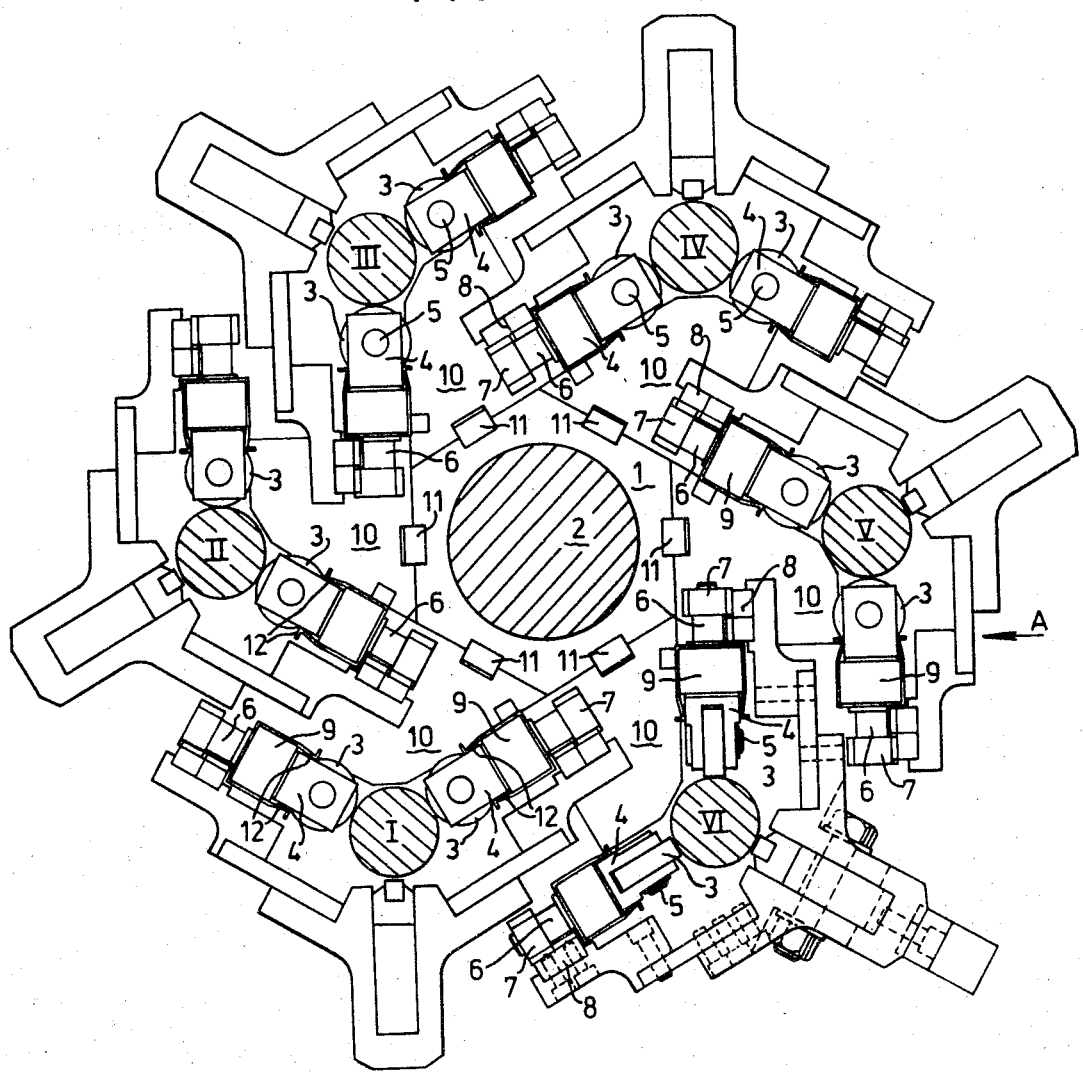
FIG. 1 is a sectional end view through a bar feeder including idler rollers according to the invention, some of the idler rollers being shown in the machining position and some in the bar feed position.

Referring to the drawings and particularly to FIG. 1, a hexagonal portion 1 of a shaft 2, which shaft 2 connects the machining head of a multispindle machine tool to a bar feeder and to a stock reel which holds stock to be fed to the machine tool by the bar feeder, mounts means forming six guideways. Each of the guideways shown in FIG. 1 has a length of circular section bar stock material therein, the lengths of bar stock material being numbered in the drawing according to their respective guideways I, II, III, IV, V and VI. The diameter of the lengths of bar stock material shown is the maximum which the guideways can receive but the guideways can be reduced in diameter to accomodate very much smaller diameter bar.

The bar feeder shown in FIG. 1 is adapted to feed the bar forwardly to the machine tool in the position in which the guideways VI is shown, and is adapted to be indexed around in a clockwise direction as viewed in FIG. 1, so that the guideways successively pass through the position in which the guideway VI is shown in FIG. 1. The direction of rotation and location of the feed position may be varied to accommodate the particular characteristics of the machine tool to which the bar feeder is to the feed bar.

Each of the guideways has twelve idler rollers 3, that is to say two sets of three rollers each at the front end and two sets of three rollers each at the rear end, only the extreme front idler roller of each of the front sets for each guideway being visible in FIG. 1. The idler rollers 3 for the guideways I, II, III, IV and V are shown in the orientation adopted for machining of the respective length of bar, but the idler rollers 3 of the guideway VI are shown in the orientation adopted for longitudinal bar feed.

Each of the idler rollers 3 is mounted in a forked member 4 for rotation on a pin 5, the forked member 4 being integral with a shaft 6 which at its end remote from the idler roller 3 has a gear pinion 7 secured thereon. The shaft 6 is rotatably mounted in a bearing block 9. Gear racks 8 are meshed with the gear pinions 7 and by a longitudinal movement of the year racks 8, that is to say movement parallel to the longitudinal axis of the guideways, the pinions 7 and thus the shafts 6 and the forked members 4 can be swivelled through 90° each about the axis of the respective shaft 6. The bearing blocks 9 are securable to mounting blocks 10 located on the hexagonal portion 1 of the shaft 2 by keys 11.

Leaf springs 12 pass around the bearing blocks 9 and engage the sides of the forked members 4 in both the machining position and the bar feed position to effect a positive location of the swivel position of each idler roller 3.

Figure 8:
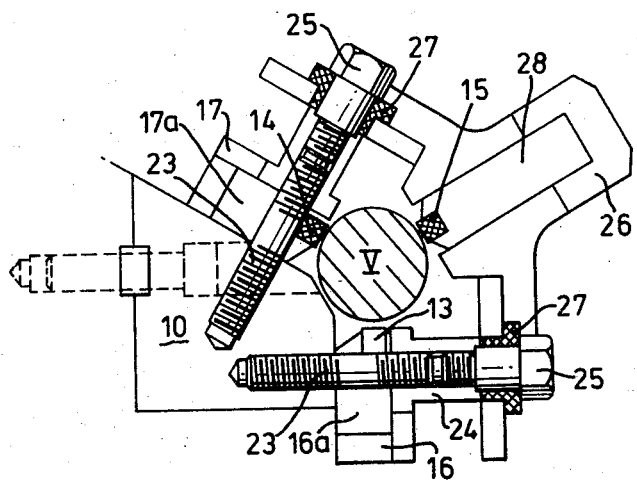
FIGS. 8 & 9 are end view showing details of mounting of parts of the guideway.

Between the sets of idler rollers at the front of each guideway and the sets of idler rollers at the rear of each guideway, the guideway is formed by three guide strips 13, 14, 15 spaced 120° apart and best seen in FIG. 8.

Figure 9:
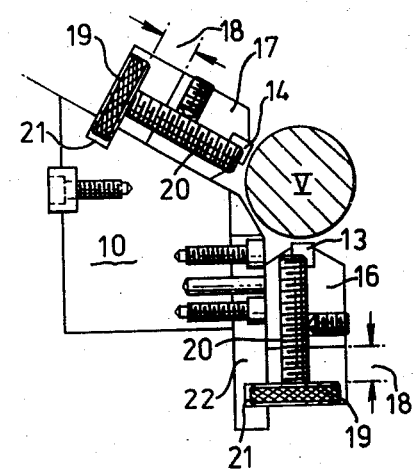
Figure 10:
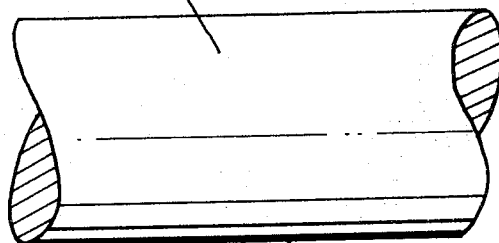
FIG. 10 is a side view showing an idler roller engaged with a length of bar to be fed.
Figure 10:
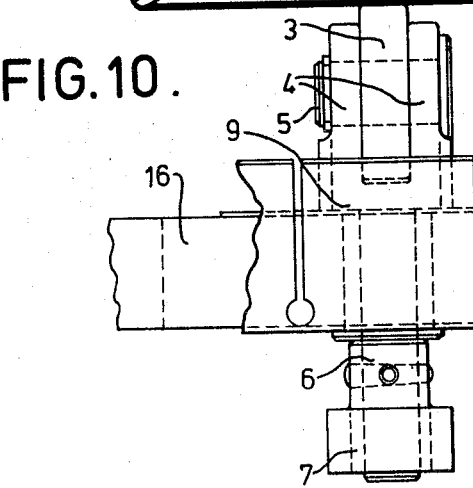
Figure 2:
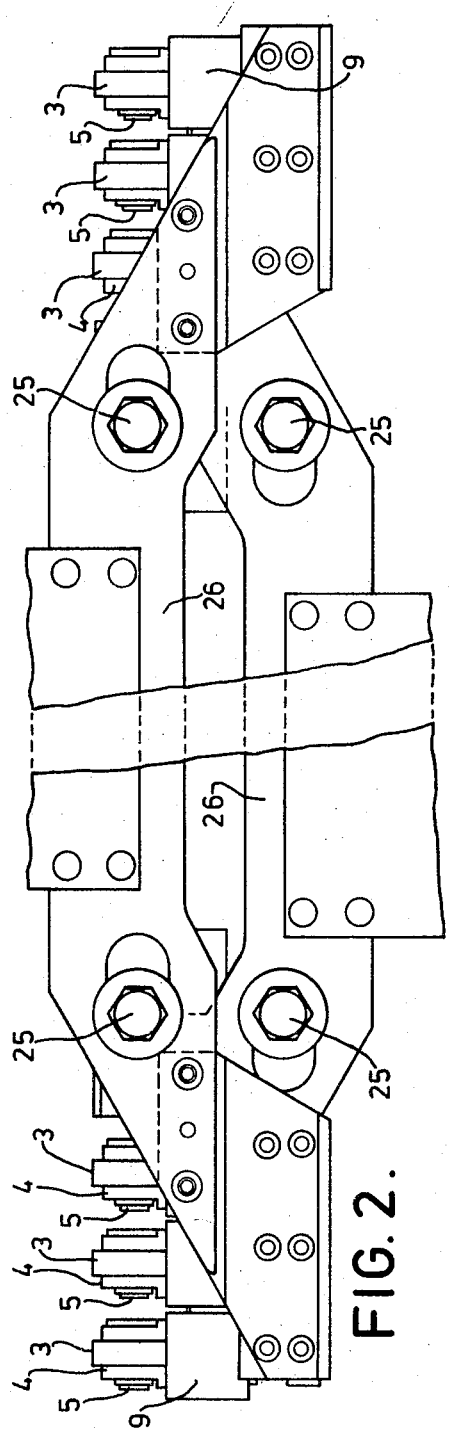
FIG. 2 is a fragmentary view taken on arrow A of FIG. 1.
Figure 11:
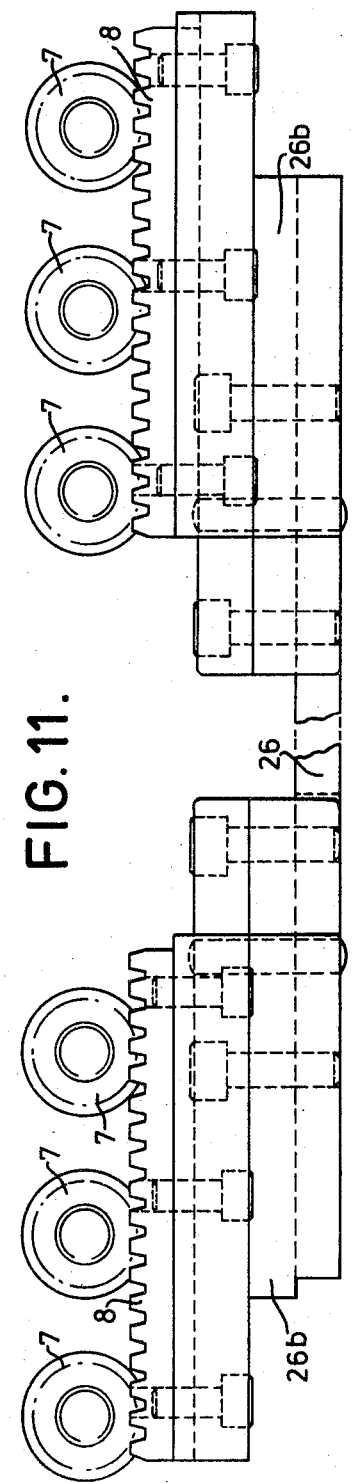
FIG. 11 shows the cooperation of movable racks of the guideways with gear pinions of the idler rollers.

The strips 13 and 14 are mounted in respective mounting bars 16 and 17, end portions of which bars 16 and 17 form the bearing blocks 9 which receive the shafts 6. The diameter of the guideways can be adjusted by unbolting the bars 16 and 17 from their respective mounting blocks 10, setting a gauge gap 18 (FIG. 9) between the head 19 of an adjusting screw 20 and the outer face of the bar 16 or 17 and rebolting the bar 16 or 17 to the respective mounting block 10 with the edge of the head 19 engaged in a groove 21 in a plate 22 secured to the respective mounting block 10 or in the mounting block 10.

Since the bearing blocks 9 are formed by end portions of the bars 16, 17, the idler rollers 3 move radially inwardly or outwardly with the strips 13, 14 of the bars 16, 17 when the diameter of the guideways is adjusted for a change in size of the bar fed by the bar feeder to the machine tool. The racks 8 are each provided of a width greater than the axial length of the gear pinions 7 so that when feeding a large diameter bar, the pinions 7 each engage a radially outer part of the respective rack 8 and when feeding a small diameter bar the pinions 7 each engage a radially inner part of the respective rack 8.

FIG. 8 shows that the bars 16, 17 are secured to the mounting blocks 10 by means of studs 23 which project from the mounting blocks 10 and pass through slots 16a, 17a in the bars 16, 17 respectively, nuts 24 being engaged on the outer ends of the studs 23 to clamp the bars 16 and 17 in desired positions to the mounting blocks 10. The nuts 24 have a greater axial length than the length of the portion of the stud 23 which projects from the respective bar 16 or 17 and thus at their outer ends provide threaded sockets in which bolts 25 can be engaged. The bolts 25 each pass through a respective wing portion 26a of a bar 26, in which bar 26 the strip 15 is mounted, and, by means of shouldered nylon bushes 27 and longitudinally slotted holes in the wing portions of the bar 26, secure the bar 26 to the nuts 24 in a manner which permits the bar of the to slide longitudinally of the guideway.

Figure 6:
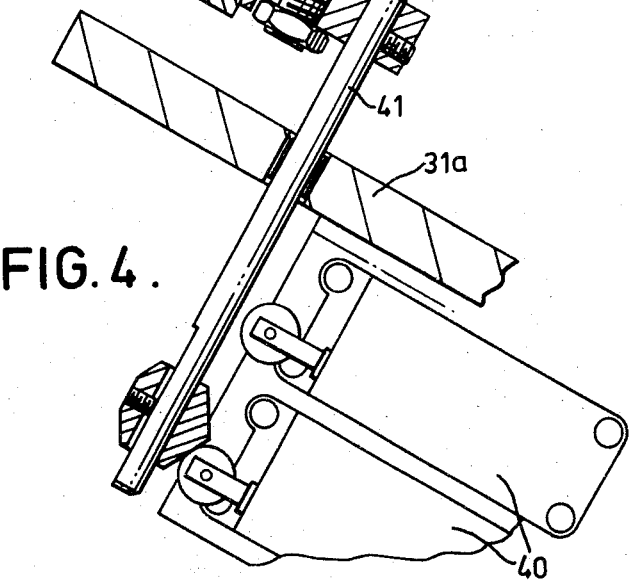
FIG. 6 is a more detailed view showing the part of the control means illustrated in FIG. 3.

As can be seen from FIG. 1, the racks 8 are mounted on extreme wing portions 16b of the bars 26 and thus move longitudinally to rotate the pinions 7 and thus the shafts 6 mounting the idler rollers 3 when the bar 26 is moved longitudinally. The strip 15 is axially mounted in an intermediate member 28 which is adjustable, in directions radially of the guideway with respect to the bar 26 when a change in diameter of bar to be fed is to be effected, by means of bolts 28a through slotted holes 28b (FIG. 6), adjustment being determined by a gauge gap 28c.

Figure 3:
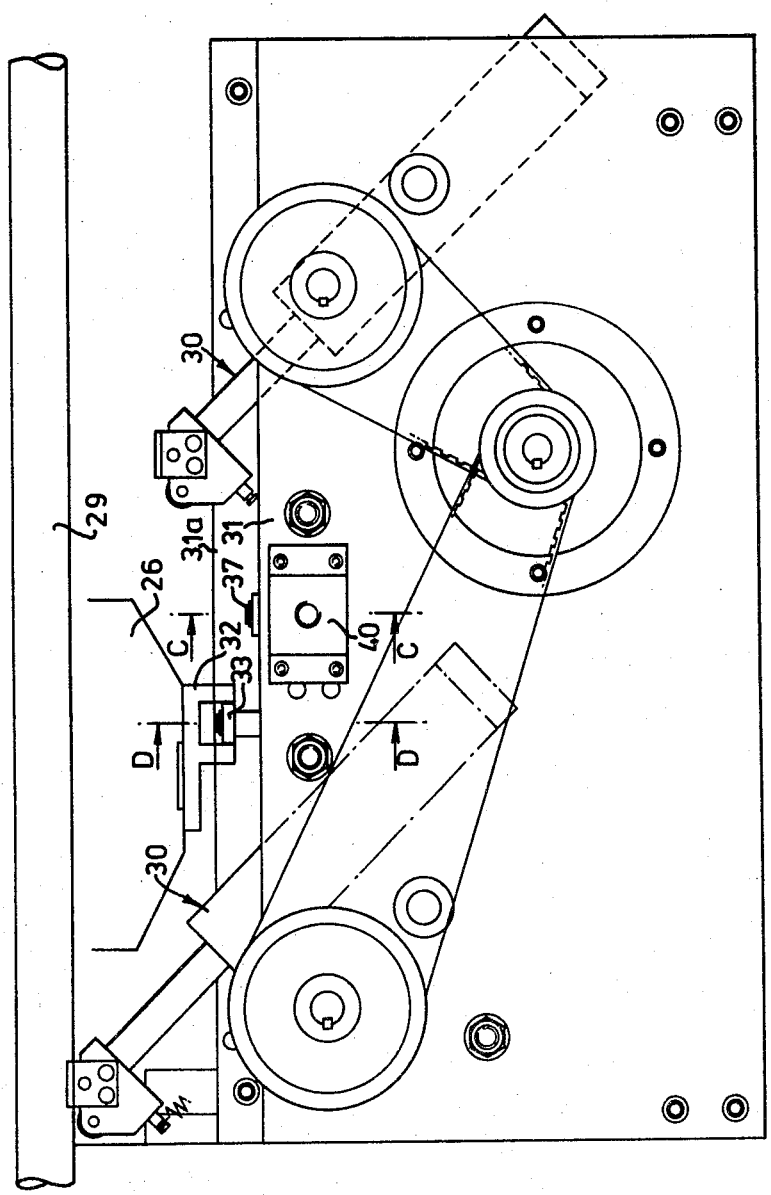
FIG. 3 is a side view showing the cooperation of idler roller control means with feed means to feed bars longitudinally through the guideway.
Figure 5:
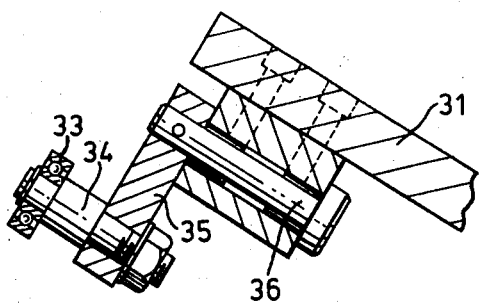
FIG. 5 is a fragmentary sectional view on line D—D of FIG. 3.
Figure 4:
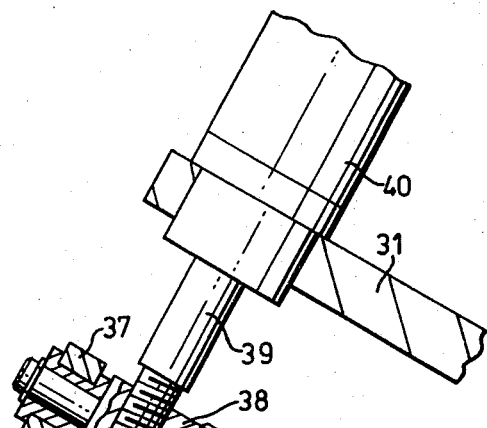
FIG. 4 is a fragmentary sectional view on line C—C of FIG. 3.
Figure 7:
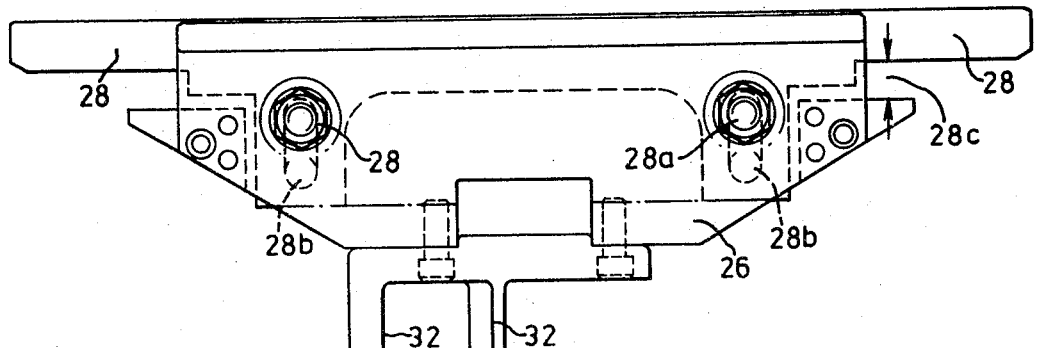
FIG. 7 is a view in the direction of arrow VII of FIG. 6.
Figure 7:
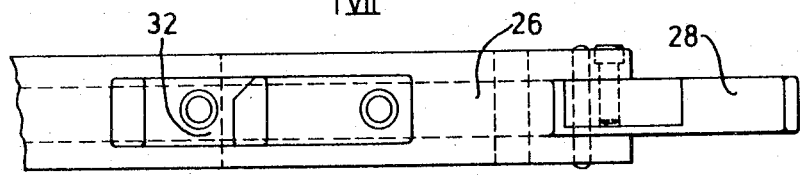

Referring to FIG. 3, a length of bar 29 which lies in the guideway VI can be fed leftwardly as viewed in FIG. 3 by means of two belt driven, crank-mounted, longitudinally compressible members 30, the construction and operation of which is disclosed in copending application Ser. No. 423,839 filed Dec. 11, 1973 filed by Ewart Harold Doe. The feed members 30 are mounted between a pair of parallel plates 31, 31a. FIG. 3 shows that the bar 26 carries a forked cam member 32 which cooperates with a fixed roller 33 mounted on the plate 31. The forked cam member 32, as can be seen from FIGS. 6 and 7, defines a gap the same width as the diameter of the roller 33 but with an angled lead-in such that as the roller 33 passes through the gap in the forked cam member 32, the bar 26 will be caused to move longitudinally of the bar feeder to swivel the idler rollers 3 of the respective guideway through 90°. The roller 33, as shown in FIG. 5, is mounted on a stem 34 bolted to one arm of a bell moved lever 35 which is pivoted on a pin 36. The other arm of the bell crank lever 35 has a slot therein in which a roller 37 is engaged, the roller 37 being mounted on an arm 38 coupled to a piston rod 39 of an air cylinder 40 mounted on the plate 31. A rod 41 coupled to the arm 38 passes through the mounting plate 31a and cooperates with a pair of indication switches 42.

The air cylinder 40 can thus be used to set the longitudinal position of the roller 33 with respect to the bar feeder such that the bars 26 of the respective guideways will be moved longitudinally of the guideway as each guideway is indexed, by indexing of the bar feeder, into the feed position. Thus, as each guideway is indexed into the feed position its idler rollers 3 will be swivelled into the position for longitudinal bar feed.

Alternatively, the cylinder 40 can so position the roller 33 that indexing of a guideway into the feed position does not cause longitudinal movement of the bar 26 of the guideway and swivelling of the idler rollers 3, and the cylinder 40 can be used subsequently to move the bar 26, of the guideway which is in the feed position, longitudinally. Thus, at a time in the operating cycle of the machine tool subsequent to that at which a guideway was fed into the feed position, the cylinder 40 can cause the idler rollers 3 of that guideway to swivel into the bar feed position simultaneously with opening of the respective collet of the machine tool. This alternative method would be used, for example, when a machining operation is required, on a length of bar in a guideway in the bar feed position, before the collet is opened to permit feed of the bar.

What is claimed is:

1. In a bar feeder, having a guideway and drive means, to feed bar stock material longitudinally through said guideway to a rotatable collet of a machine tool, at least one idler roller rotatable about an axis of rotation, for bearing against said bar stock material and cooperating with said drive means, mounting means for the idler roller and control means connected to said mounting means for orientating said idler roller with said axis perpendicular to the longitudinal extent of the guideway during operation of said drive means to feed said bar longitudinally through said guideway, and for orientating said idler roller with said axis parallel to the longitudinal extent of the guideway during machining of the bar by the machine tool.

2. The invention claimed in claim 1, wherein said bar feeder includes a plurality of said guideways and a plurality of said idler rollers are provided at each end of each of said guideways.

3. The invention claimed in claim 2, wherein said plurality of idler rollers comprises, at each end of each of said guideways, two sets of said idler rollers with three of said idler rollers in each set, the idler rollers of one of said sets being spaced circumferentially around the guideway from the rollers of the other of said sets.

4. The invention claimed in claim 1, wherein said idler roller is mounted to swivel about a pivot axis, said pivot axis extends perpendicular to said axis of rotation of said idler roller and perpendicular to the longitudinal extent of said guideway, said control means includes a pinion coupled to said mounting means of said idler roller and a toothed rack meshed with teeth of said pinion, and said rack is connected to a portion of said guideway which is longitudinally movable with respect to the remainder of said guideway by an amount sufficient to cause said rack to swivel said idler roller about said pivot axis through 90°.

5. The invention claimed in claim 1, wherein a respective member of said guideway on which said idler roller is mounted, is movable radially inwardly and outwardly of the guideway to adjust the diameter of the guideway to permit changes in diameter of the bar material to be fed whereby said idler roller is automatically adjusted in position for a new diameter of bar to be fed when said respective member is adjusted in position.

6. The invention claimed in claim 2, wherein each of said idler rollers is mounted to swivel about a pivot axis, said pivot axis extends perpendicular to said axis of rotation of said idler roller and perpendicular to the londitudinal extent of said guideway, said control means includes a pinion coupled to said mounting means of said idler roller and a toothed rack meshed with teeth of said pinion, said rack is connected to a portion of said guideway which is longitudinally movable with respect to the remainder of said guideway by an amount sufficient to cause said rack to swivel said idler roller about said pivot axis through 90°, and longitudinal movement of said portion of each of said guideways is effected by indexing movement of said bar feeder to cause that guideway to move into an indexed position of the bar feeder at which bar is to be fed longitudinally through that guideway.

7. The invention claimed in claim 6, wherein said longitudinal movement is caused by a roller cooperating with a cam track, one of the roller roller and the cam track being indexed around with the bar feeder and the other being stationary.

8. The invention claimed in claim 2, wherein said control means includes an air cylinder controlled by programming means of said machine tool.

* * * * *